(12) United States Patent
Cote et al.

(10) Patent No.: US 9,416,237 B2
(45) Date of Patent: Aug. 16, 2016

(54) TETHERED ORGANIC SILOXY NETWORK FILM COMPOSITIONS

(71) Applicant: Xerox Corporation, Norwalk, CT (US)

(72) Inventors: Adrien Pierre Cote, Clarkson (CA); Brynn Mary Dooley, Toronto (CA); Anthony Wigglesworth, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/517,083

(22) Filed: Oct. 17, 2014

(65) Prior Publication Data

US 2016/0108190 A1    Apr. 21, 2016

(51) Int. Cl.
*C08J 5/18*    (2006.01)

(52) U.S. Cl.
CPC .............. *C08J 5/18* (2013.01); *C08J 2383/00* (2013.01)

(58) Field of Classification Search
CPC .............................. C07F 7/1836; C08G 77/50
See application file for complete search history.

(56) References Cited

U.S. PATENT DOCUMENTS

| | | | |
|---|---|---|---|
| 8,096,649 B2 | 1/2012 | Sambhy et al. | |
| 8,226,207 B2 | 7/2012 | Kovacs et al. | |
| 8,268,399 B2 | 9/2012 | Gervasi et al. | |
| 8,292,404 B2 | 10/2012 | Zhao et al. | |
| 8,506,051 B2 | 8/2013 | Gulvin et al. | |
| 8,534,797 B2 | 9/2013 | Zhao et al. | |
| 8,651,621 B2 | 2/2014 | Ahl et al. | |
| 8,692,011 B2 | 4/2014 | Moorlag et al. | |
| 2005/0062801 A1 | 3/2005 | Kato et al. | |
| 2012/0242749 A1* | 9/2012 | Moorlag | C09D 201/10 347/45 |

OTHER PUBLICATIONS

Anthony Wigglesworth, et al., U.S. Appl. No. 14/138,794, filed Dec. 23, 2013, "Organosiloxane Network Composition," not yet published.
Anthony Wigglesworth, et al., U.S. Appl. No. 14/138,802, filed Dec. 23, 2013, "Fluorinated Organosiloxane Network Composition," not yet published.
Office Action for U.S. Appl. No. 14/138,802, dated Jun. 9, 2015, 11 pages.
Notice of Allowance for U.S. Appl. No. 14/138,802, dated Sep. 14, 2015, 22 pages.
Office Action for U.S. Appl. No. 14/138,794, dated Feb. 26, 2015, 36 pages.
Final Office Action for U.S. Appl. No. 14/138,794, dated Jul. 27, 2015, 12 pages.
Advisory Action for U.S. Appl. No. 14/138,794, dated Oct. 1, 2015, 4 pages.

* cited by examiner

*Primary Examiner* — Kuo-Liang Peng
(74) *Attorney, Agent, or Firm* — Marylou J. Lavoie, Esq. LLC

(57) ABSTRACT

An organo siloxy network film composition including at least one type of tether molecule having a siloxy functionality; at least one type of building block having a siloxy functionality; wherein the tether molecule and the building block each have the same siloxy functionality; and wherein the siloxy functionality in the organo siloxy network film is derived from the same siloxy functionality on both the tether molecules and the building blocks.

18 Claims, 2 Drawing Sheets

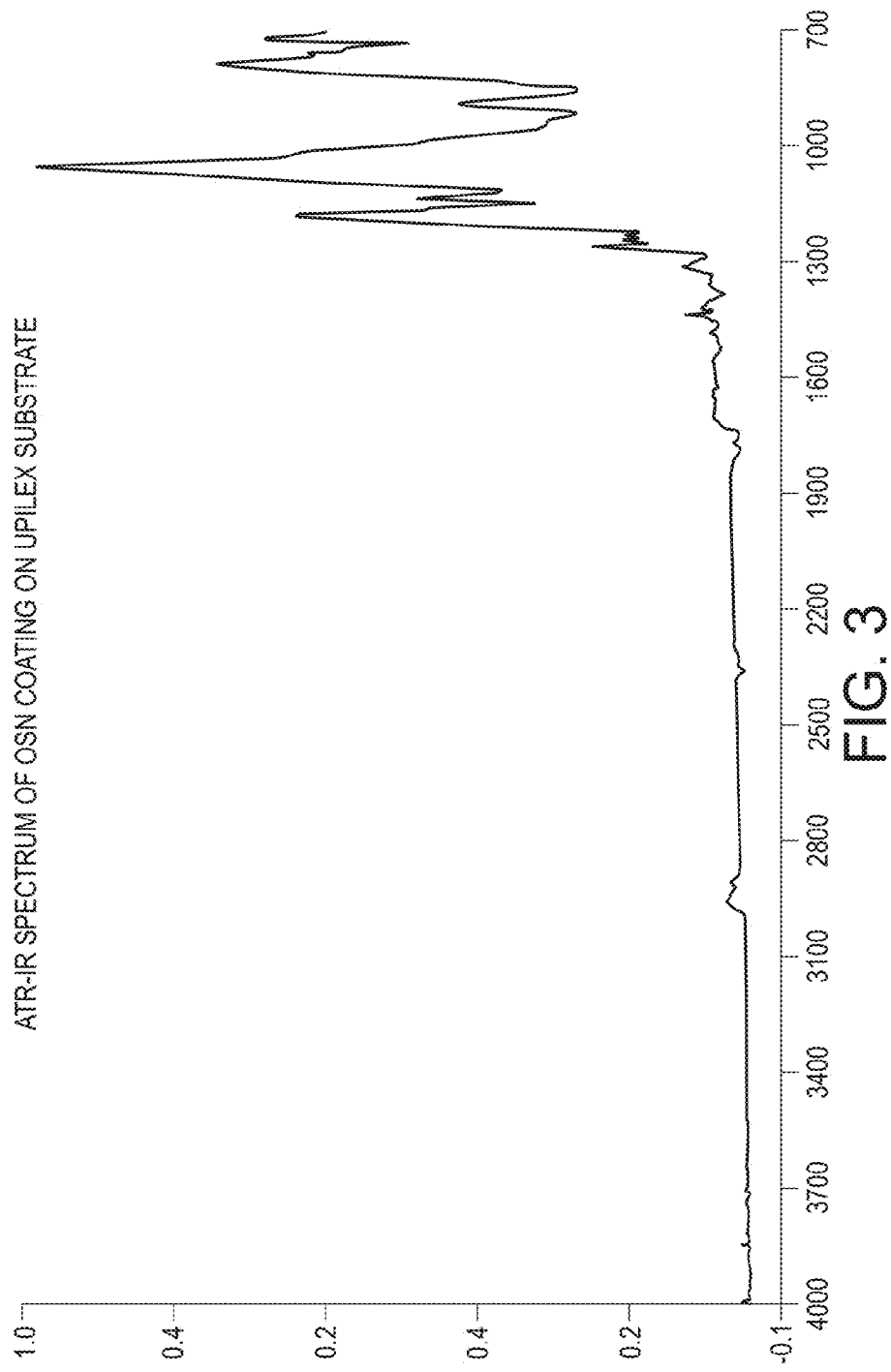

TETHERED ORGANIC SILOXY NETWORK FILM COMPOSITIONS

RELATED APPLICATIONS

Commonly assigned U.S. patent application Ser. No. 14/138,794, entitled "Organosiloxane Network Composition"), filed Dec. 23, 2013, is hereby incorporated by reference herein in its entirety.

Commonly assigned U.S. patent application Ser. No. 14/138,802, entitled "Fluorinated Organosiloxane Network Composition"), filed Dec. 23, 2013, is hereby incorporated by reference herein in its entirety.

BACKGROUND

Disclosed herein is a film composition. More particularly, disclosed herein is an organic siloxy network (OSN) film composition having uniformly dispersed and fully bonded (cross-linked) tethers. In embodiments, the OSN film comprises fluorinated OSN building blocks and fluorinated tethers. The tethered OSN films described herein can be used for various applications. In embodiments, the tethered OSN films herein can be used as anti-wetting coatings for ink jet print head faceplates.

Organic siloxy networks (OSN) are a class of materials that have been explored as materials in a number of applications in the forms of powders, monolithic parts, and films/coatings. It is common in the OSN art that the properties of OSNs are tuned by incorporating functionalized alkoxysilane monomers into the TEOS-based network from which OSNs are nominally built (via sol-gel cross-linking reaction). Another method to adjust the properties of OSNs is to introduce mono functionalized alkoxysilane monomers that can be bonded into the siloxy network (as 'tethers') during the cross-linking step en route to the final OSN material. However, the desired homogenous integration of such tethers into the final material is not straightforward; phase segregation and poor cross-linking chemistry is normally encountered (even when practicing the few approaches disclosed in literature). Furthermore, in the case of OSN films, which are made via a solution-based coating process, creating a high quality material is complicated by the fact that drying and curing are combined in a single process step.

The concept of a tethered OSN composition comprising a monofunctionalized alkoxysilane molecule introduced and integrated into the OSN upon conducting a sol-gel cross-linking reaction can be shown as follows:

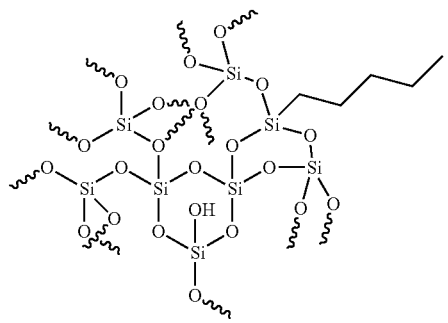

The dangling portion of the tether can protrude into the networked matrix of the film or to the surface. The introduction of a tether to an OSN can impart functional properties to the composition.

The benefit of using a tethering approach to functionalize OSNs lies in the fact that it is easier to mono-functionalize a molecule with a cross-linkable alkoxysilane group than it is to di-functionalize an OSN building block. A greater diversity of functionalization opportunities is enabled to rapidly tune properties to access performance targets.

Organosiloxy network (OSN) films comprised of alkoxysilane starting materials combined with tetraethoxysilane (TEOS) have been broadly disclosed in the open scientific literature. Typical in such approaches, a mixture of siloxy ether groups are employed as illustrated below including when tethers are introduced to the system. For the most part TEOS is the major component of these compositions. In this disclosure such compositions will be referred to as 'TEOS-based' approaches.

Example components (building blocks) typically employed for siloxy network synthesis are shown below. Note the difference in atomic connectivity around Si atoms between building blocks. Use of combinations of such building blocks and/or tether molecules leads OSN systems that are 'mixed siloxy systems.'

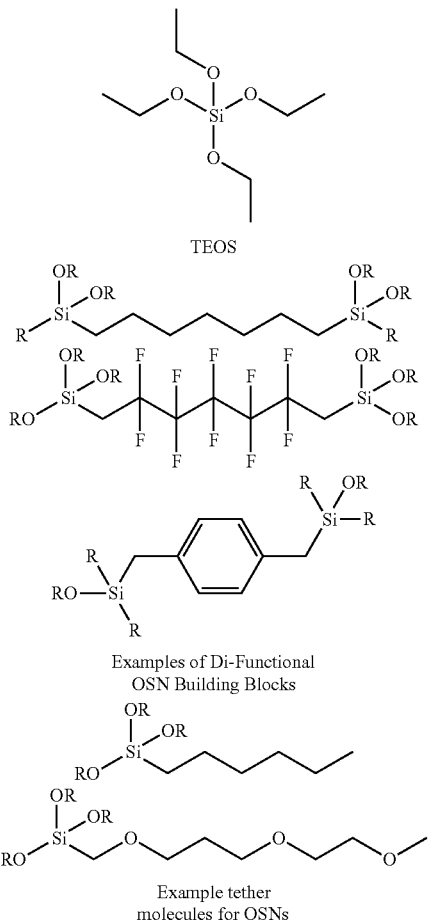

Examples of Di-Functional OSN Building Blocks

Example tether molecules for OSNs

Furthermore, in the case of OSN films, which are made via a solution-based coating process, creating a high quality material is complicated by the fact that drying and curing are combined in a single process step. Obtaining uniformly dispersed and fully bonded (cross-linked) tethers in OSN films has remained a challenge. However, in spite of these challenges, OSN films/coatings are inherently robust materials and are desired as new materials for various applications including printer components since properties can be added and tuned to meet performance targets via integration of tethers (e.g. light absorption; anti-wetting).

U.S. Pat. No. 8,692,011, which is hereby incorporated by reference herein in its entirety, describes in the abstract thereof a novel composition for use as a print head face plate coating. In particular, the coating comprises siloxyfluorocarbon (SFC), which is composed of networked precursors containing reactive siloxane groups attached to fluorocarbon chains. The SFC coatings can be used to produce a surface whereby solid ink and ultraviolet (UV) curable inks do not adhere when applied at elevated temperatures and over an extended period of time. The advantages of the coating are fewer print head related defects, and longer front face life.

Currently available film compositions and methods are suitable for their intended purposes, there remains a need for improved film compositions and methods for preparing same. Further, a need remains for a method for obtaining uniformly dispersed and fully bonded (cross-linked) tethers in OSN films for obtaining robust films/coatings that are desired for printer components to introduce added properties (e.g. light absorption; anti-wetting) and life extension (abrasion and thermal resistance).

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an organo siloxy network film composition comprising at least one type of tether molecule having a siloxy functionality; at least one type of building block having a siloxy functionality; wherein the tether molecule and the building block each have the same siloxy functionality; and wherein the siloxy functionality in the organo siloxy network film is derived from the same siloxy functionality on both the tether molecules and the building blocks.

Also described is a process for preparing a tethered organo siloxy network film composition comprising (a) dissolving building block(s) and tether(s) in an alcohol; (b) adding water to liquid in step (a) at from about 1 to about 6 molar ratio to moles of Si in solution in (a); (c) adding Bronstead base to the liquid of step (b) at from about 0.001 to about 0.1 molar ratio to moles of Si in liquid in step (b); (d) optionally heating the liquid in step (c); depositing the reaction mixture as a wet film; and promoting a change of the wet film and forming a dry tethered organo siloxy network film composition comprising at least one type of tether molecule having a siloxy functionality; at least one type of building block having a siloxy functionality; wherein the tether molecule and the building block each have the same siloxy functionality; and wherein the siloxy functionality in the organo siloxy network film is derived from the same siloxy functionality on both the tether molecules and the building blocks.

Also described is an ink jet print head face plate having disposed thereon an organo siloxy network film composition comprising at least one type of tether molecule having a siloxy functionality; at least one type of building block having a siloxy functionality; wherein the tether molecule and the building block each have the same siloxy functionality; and wherein the siloxy functionality in the organo siloxy network film is derived from the same siloxy functionality on both the tether molecules and the building blocks.

BRIEF DESCRIPTION OF THE DRAWINGS

FIG. 3 is an infrared spectrum of the OSN coating composition.

DETAILED DESCRIPTION

Figure 1:
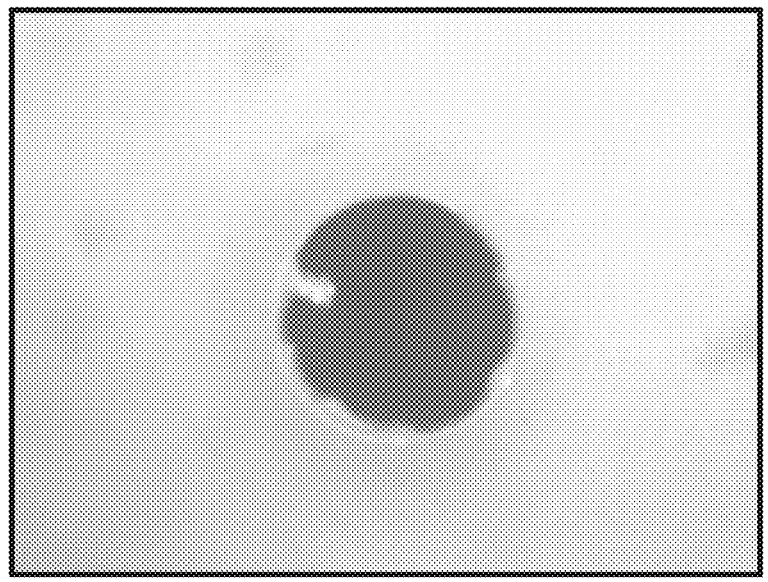
FIG. 1 is an illustration of laser drilling performance on a control Example OSN film.

Described is an organo siloxy network film composition comprising at least one type of tether molecule and at least one type of building block, wherein the siloxy functionality in the organo siloxy network film is derived from the same siloxy functionality on both the tether molecules and the building blocks. The network that is formed is formed from reactive groups in the tether and building blocks which reactive groups must be the same.

In embodiments, the organo siloxy network film composition contains a siloxy functionality that is derived from the same siloxy functionality on both the tether and the building block, wherein the siloxy functionality used on both the tether molecule and the building block is of the formula

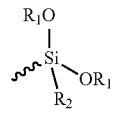

wherein each $R_1$ and $R_2$ are independently selected chemical groups, provided that $R_2$ on both the tether molecule and the building block is the same chemical group, and the wavy line indicates a bond to a tether molecule or building block moiety.

In embodiments, each $R_1$ and $R_2$ are independently selected from the group consisting of an alkyl group having from about 1 to about 22 carbon atoms, provided that $R_2$ is the same on both the building block and the tether molecule, and the wavy line indicates a bond to a tether molecule or building block moiety.

In embodiments, the building block has a plurality of siloxy functionality, that is, the building block contains more than one siloxy functional group. In certain embodiments, the building block has a plurality of siloxy functionality ranging from about 2 to about 4 siloxy functional groups.

In embodiments, one or both of $R_1$ on the tether molecule, but not the building block, comprises a chemical group selected from the group consisting of an aryl group, an alkylaryl group containing from about 6 to about 30 carbon atoms, wherein the alkylaryl group optionally further comprises an optional fluorine or an optional nitro group, or a combination thereof.

In embodiments, the tether, but not the building block, contains a member of the group consisting of alkyl, substituted alkyl groups, perfluorinated alkyl groups, partially fluorinated alkyl groups, aryl, substituted aryl groups, perfluorinated aryl groups, partially fluorinated aryl groups, poly alkyl ethers, substituted poly alkyl ethers groups, perfluorinated poly alkyl ethers groups, partially fluorinated poly alkyl ethers groups, and combinations thereof.

Also described is an ink jet print head face plate having disposed thereon the present organo-silane network film compositions.

In some embodiments, organo-silane network film compositions having uniformly dispersed and fully bonded (fully cross-linked or fully reacted) tethers are provided. Tethered organic siloxy network compositions access materials with multiple functional attributes and are suitable for a variety of applications including as materials for ink jet face plate anti-wetting coatings and fusing top coat materials. The present embodiments provide a broad coverage of tethered organic siloxy network film compositions for electroactivity, hydrophilicity, and photochromophore. In some embodiments, compositions herein are suitable for low surface energy applications and for enabling laser ablation.

Alternately, the organo-silane network film composition comprises a film wherein the tether is non-uniformly dispersed throughout the film. By non-uniformly dispersed, it is meant that there are detectable domains of tether molecules present. Domains can be detected using normal analytical techniques such as microscopy or possibly by observing differential properties of the film in different regions of the film. It is understood that differential properties in different regions of the film is not necessarily a result of a domains being present. In these embodiments, the tether can be, for example, concentrated in a certain area or layer of the film.

The present tethered OSN compositions have been enabled by identifying a specific composition design space; in embodiments, by using the same alkoxysilane functional group on both the nominal OSN building block and tether molecule. In embodiments, novel OSNs film compositions are described. By targeting the present tethered OSN film compositions wherein the same siloxy functionality is used, consistent and desirable performance characteristics can be obtained with nil sample-to-sample variation. The tethered OSN compositions access materials with multiple functional attributes and are suitable for a variety of applications, in embodiments, as materials for ink jet faceplate anti-wetting coatings and fusing top coat materials.

OSN films comprised largely of tetraethoxysilane (TEOS) with some loading of alkoxysilane building blocks have been broadly disclosed in the open scientific literature (referred to herein as TEOS-based systems), and a subset of these disclosures contain tether units.

The compositions described herein are distinct from TEOS-based systems because they do not contain TEOS: a differentiating feature that is an embodiment of this disclosure.

Encompassed within the scope of the present disclosure is the unique and enabling composition space that has been identified described herein comprising OSN compositions and applications comprising a tethered organo siloxy network comprising at least one tether molecule and at least one building block, wherein the tethered organo siloxy network contains the same siloxy functionality between both the tether molecule and the building block.

In embodiments, the compositions herein comprise one or a combination of features including:

Fully cross-linked tethered organic siloxy network films wherein the same alkoxysilane functional group is employed on both the OSN building block and tether molecule;

Tethered OSN films that contain homogenously distributed tethers (no phase segregation of tethers in compositions);

Tethered OSN film compositions comprising a single tether; and/or

Tethered OSN film compositions comprising a plurality of tethers;

Presence of tethers in OSN compositions to impart desirable properties to OSN film compositions (e.g. antiwetting or light absorption) and stabilization of the process variability encountered when mixed siloxy systems are pursued.

In embodiments, the compositions herein are directed to OSN films as antiwetting coatings for inkjet faceplates.

The organo siloxy network film can contain a single type of tether molecule; or a plurality of different types of tether molecules.

In certain embodiments, a fluorinated tether enriches fluorine content in the OSN enabling the automatic de-wetting of molten solid ink from the coating.

In other embodiments, the film composition further comprises a light absorbing chromophore tether. A second light absorbing chromophore tether can be introduced to the OSN anti-wetting coating enabling clean laser drilling of the layer and shaping the layer appropriately as part of the ink jet face plate assembly.

Any suitable or desired light absorbing chromophore tether can be selected. In embodiments, the second light absorbing chromophore tether is selected from the group consisting of aromatic groups containing from about 6 to about 18 carbons, including substituted aromatic groups.

Specific embodiments herein are directed to the specific requirements upon the nature of the silicon groups in the composition. The general chemical structure of the enabling reactive silicon group is shown below:

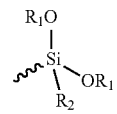

wherein the wavy line represents the attachment to the remaining tether molecule or the component of the OSN building block. This is illustrated in general below:

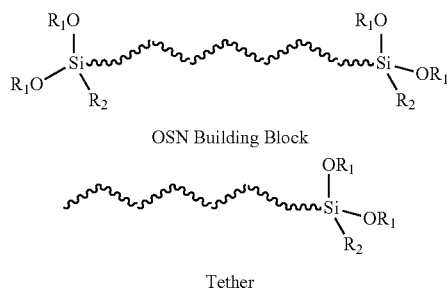

OSN Building Block

Tether

In certain embodiments, the organo-silane tethered film composition herein comprises a tethered organo-siloxy network comprising at least one tether molecule having a siloxy functionality and at least one building block having a siloxy functionality, wherein the siloxy functionality on both the tether molecule and the building block is the same, wherein the building block is of the formula

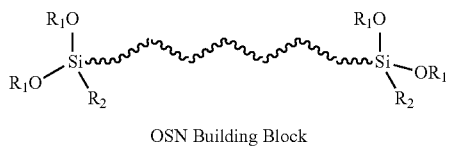

OSN Building Block wherein each $R_1$ and $R_2$ are each independently selected from the group consisting an alkyl group having from about 1 to about 22 carbon atoms, and mixtures thereof; and wherein the tether molecule is of the formula

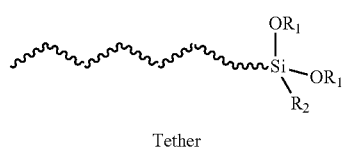

Tether wherein each $R_1$ and $R_2$ are each independently selected from the group consisting of an alkyl group having from about 1 to about 22 carbon atoms, and mixtures thereof, provided that $R_2$ is the same on both the building block and the tether molecule.

In specific embodiments, each $R_2$ is an alkyl group, such as an alkyl group selected from the group consisting of methyl, ethyl, isopropyl, and mixtures thereof.

In embodiments, each $R_1$ is independently selected from the group consisting of methyl, ethyl, propyl, isobutyl, and mixtures thereof.

In certain embodiments, the building block and the tether each comprise a silicon group of the formula

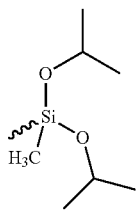

wherein ∼∼∼ represents the point of attachment between the OSN building block and the tether molecule.

The present film compositions comprise the compositions resulting from the reaction of OSN building blocks and tether outfitted with the reactive silicon groups illustrated above.

The organo-silane network film composition contains, in embodiments, the tether present at a molar ratio between tether and building block of tether:building block of from about 1:100 to about 75:100.

In embodiments, the organo siloxy network comprises at least one fluorinated tether molecule and at least one fluorinated building block.

An ink jet print head face plate is also provided having disposed thereon an organo-silane network film comprising at least one type of tether molecule and at least one type of building block, wherein the tether molecule and the building block each have the same siloxy functionality of the formula

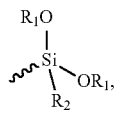

wherein $R_1$ and $R_2$ are each independently selected from the group consisting of an alkyl group having from about 1 to about 22 carbon atoms, provided that $R_2$ is the same on both the building block and the tether molecule, and the wavy line indicates a bond to a moiety on the tether or building block moiety; wherein organo-silane network film has an organo-silane network that is derived from the siloxy functionality on both the tether molecules and the building blocks; and optionally, wherein the organo-silane network film composition further comprises a light absorbing chromophore tether.

The present OSN materials can provide a print head face plate anti-wetting coating that maintains high drool pressure and low ink adhesion over the life of the part. The present coating embodiments can de-wet current and future solid and UV inks. The present coating embodiments provide a contact angle with solid ink that is greater than 55° and a sliding angle that is less than 20°. In addition to exhibiting good anti-wetting properties, the present coating embodiments are mechanically and thermally robust sufficient to survive the print head build process which can consist of two cycles of 290° C./350 psi for 30 minutes, 2000+ wipes by a wiper blade, and operate at 115° C. for approximately 2 years. Further, the present embodiments cleanly laser ablate so as to introduce the required apertures jetting nozzles.

The properties of the tethered OSN film compositions can be varied by the selection of tether. Applications for tethered OSN films can thus be extended to applications including hydrophilic, electroactive, antifouling, photochromic, and ion conductive coating applications, among others. The present tethered OSN film compositions further encompass embodiments incorporating tethers selected in accordance with the desired application.

The tether molecule can be selected such that the presence of the tether imparts a desired property to the organo-silane network film. Specific tethers can be selected to impart specific properties. In some embodiments, the tether molecule is selected such that the presence of the tether enhances the inherent properties of the organo-silane network. In other embodiments, the tether molecule is selected such that the presence of the tether attenuates, that is reduces or eliminates altogether, the inherent properties of the organo-silane network. In specific embodiments, the organo-silane network film composition comprises a tether wherein the tether molecule comprises a member of the group consisting of organofluorine, aryl, alkyl, polyether, fluro-polyether, alkyl amine, alkylesters, alkyl sulfonates, aryl amines, alkyl alcohols, and alkyl carboxylic acids.

The tether molecule can be selected to impart a desired light absorption property to the film. In embodiments, the organo siloxy network film composition includes a tether molecule, wherein the tether molecule is selected such that the presence of the tether imparts a desired light absorption property to the film, wherein the siloxy functionality used on both the tether molecule and the building block is of the formula

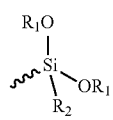

wherein each $R_1$ and $R_2$ are independently selected chemical groups, provided that $R_2$ on both the tether molecule and the building block is the same chemical group, and the wavy line indicates a bond to a tether molecule or building block moiety;

wherein the tether molecule comprises a member of the group consisting of organofluorine, aryl, alkyl, polyether, fluro-polyether, alkyl amine, alkylesters, alkyl sulfonates, aryl amines, alkyl alcohols, and alkyl carboxylic acids; and wherein one or both of $R_1$ on the tether molecule, but not the building block, comprises a chemical group selected from the group consisting of an aryl group, an alkylaryl group containing from about 6 to about 30 carbon atoms, wherein the alkylaryl group optionally further comprises an optional fluorine or an optional nitro group, or a combination thereof;

to impart a light absorption property to the organo-silane network film of from about 190 nanometers to about 350 nanometers.

In other embodiments, the tether molecule is selected such that the presence of the tether imparts a desired anti-wetting property to the film. In embodiments, the organo-silane network film comprises a tether molecule wherein the tether contains at least 1 to about 30 carbon atoms and from 1 to about 50 fluorine atoms, to impart an anti-wetting property to the organo-silane network film wherein the film exhibits a water contact angle of from about 80 degrees to about 160 degrees.

In still other embodiments, the tether molecule is selected such that the presence of the tether imparts a desired abrasion resistance characteristic to the film.

In still further embodiments, the tether molecule is selected such that the presence of the tether imparts a desired thermal resistance to the film. It has been unexpectedly found that the organo-silane network film herein exhibits thermal stability. The tethered organo-silane network film herein remains stable and functional at elevated temperatures, in embodiments, at temperatures of from about 200 degrees to about 300 degrees Celsius. In embodiments, the tethered organo-silane network film herein has a thermal stability of from about 200 degrees to about 300 degrees Celsius.

The organo-silane network film can contain a single type of tether molecule; or a plurality of different types of tether molecules.

For example, in specific embodiments, the tether can comprise an electroactive tether of the formula

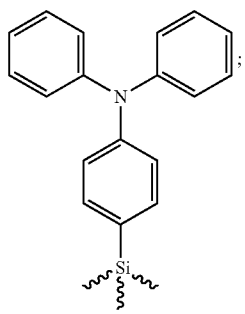

a hydrophilic tether of the formula

or a hydrophilic tether of the formula

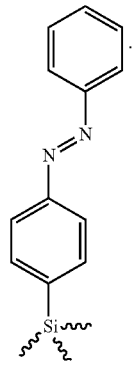

In a specific embodiment, the tethered organo siloxy network comprises a building block of the formula

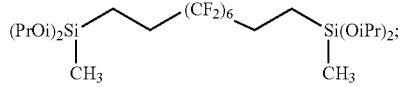

a tether of the formula

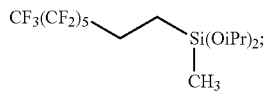

and a chromophore tether of the formula

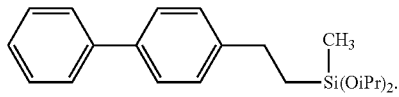

In embodiments, the organo-silane network film is a substantially pinhole-free film.

In embodiments, a "substantially pinhole-free TETHERED OSN" or "pinhole-free TETHERED OSN" may be formed from a reaction mixture deposited on the surface of an underlying substrate. The term "substantially pinhole-free TETHERED OSN" refers, for example, to an TETHERED OSN that may or may not be removed from the underlying substrate on which it was formed and contains substantially no pinholes, pores or gaps greater than the distance between the cores of two adjacent segments per square cm; such as, for example, less than 10 pinholes, pores or gaps greater than about 250 nanometers in diameter per $cm^2$, or less than 5 pinholes, pores or gaps greater than about 100 nanometers in diameter per $cm^2$. The term "pinhole-free TETHERED OSN" refers, for example, to an TETHERED OSN that may or may not be removed from the underlying substrate on which it was formed and contains no pinholes, pores or gaps greater than the distance between the cores of two adjacent segments per $micron^2$, such as no pinholes, pores or gaps greater than about 500 Angstroms in diameter per $micron^2$, or no pinholes, pores or gaps greater than about 250 Angstroms in diameter per $micron^2$, or no pinholes, pores or gaps greater than about 100 Angstroms in diameter per $micron^2$.

The organo-silane tethered network films of the present disclosure can be prepared by any suitable or desired process. In embodiments, a process for preparing a tethered organo-silane network film comprises (a) dissolving building block(s) and tether(s) in an alcohol; (b) adding water to liquid in step (a) at from about 1 to about 6 molar ratio to moles of Si in solution in (a); (c) adding Bronstead base to the liquid of step (b) at from about 0.001 to about 0.1 molar ratio to moles of Si in liquid in step (b); (d) optionally heating the liquid in step (c); depositing the reaction mixture as a wet film; and promoting a change of the wet film and forming a dry tethered organo siloxy network film as describe herein.

In embodiments, the tether molecule can be uniformly dispersed in the film or non-uniformly dispersed in the film. Whether the tether is uniformly dispersed in the film or non-uniformly dispersed in the film is driven by chemical self-assembly phenomena which are non-obvious in these systems.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

The tethered OSN formulations of the following examples were prepared by combining OSN building blocks and tethers and dissolving in n-butanol or n-butanol/cyclopentanol mixtures to give a 40 to 75 weight % solids formulation. Tethers were loaded from 1 up to 60 weight % of the solid content of the formulation. One molar equivalent of water and 0.3-0.8 mol % hydroxide ion catalyst were added to induce sol formation (cross-linking reaction). The sol was filtered and draw down coated on a number of substrates including: Upilex® (polyimide), aluminum, glass, and Mylar®. A uniform wet layer was obtained on the substrate. The coatings were immediately cured at 160 or 180° C. for 30 minutes or 1 hour yielding uniform 1-2 μm, clear, colorless films.

Example 1

In the instant example, the following silicon group was used on both the OSN building block and tether:

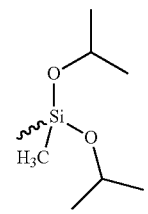

wherein ⁓ represents the point of attachment between the OSN building block and the tether molecule.

Example 2

A tethered OSN films was prepared which met the integration and performance requirements for an anti-wetting coating. Two tethers were employed: one to add fluorine content to attain targeted anti-wetting characteristics and a second chromophore tether to enable ablation from laser light. The process and schematic of the resulting tethered OSN composition is illustrated below. Note that the same alkoxysilane functional group was employed on each of the components.

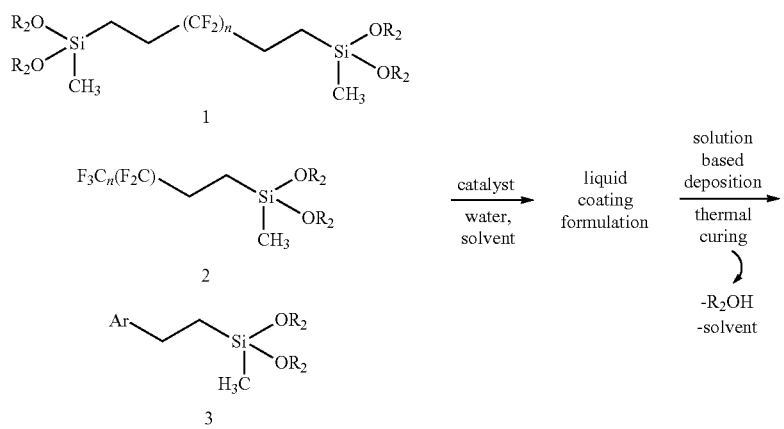

-continued

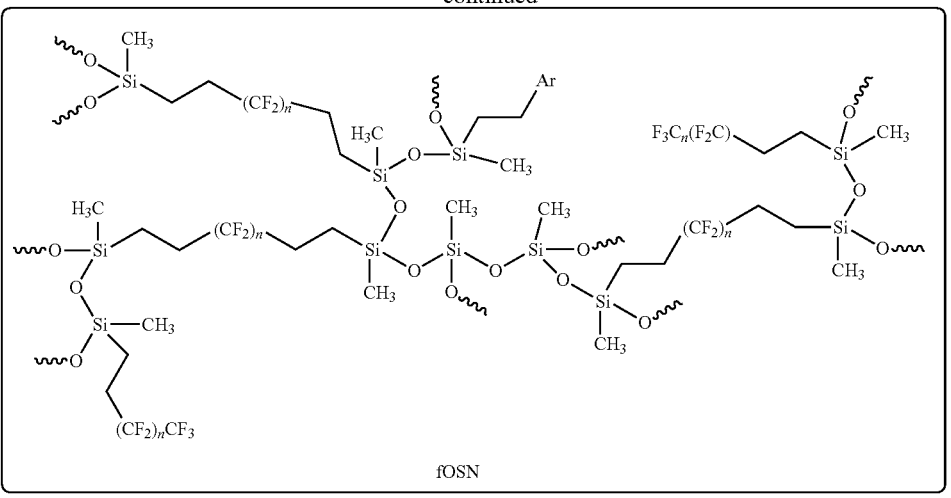

fOSN

Using the tether approach of the present embodiments, considerable latitude is enabled to tune the surface energy and ablation efficiency by adjusting the tether loading and/or by swapping the tethers selected to introduce the desired properties. In embodiments, the particular combination of tether types and loadings provided in the specific compositions below demonstrated excellent ink de-wetting and laser ablation performance. Specific embodiments of OSN building block, fluorinated, and chromophore tethers (with loadings) in combination generated the functional tethered OSN film shown below.

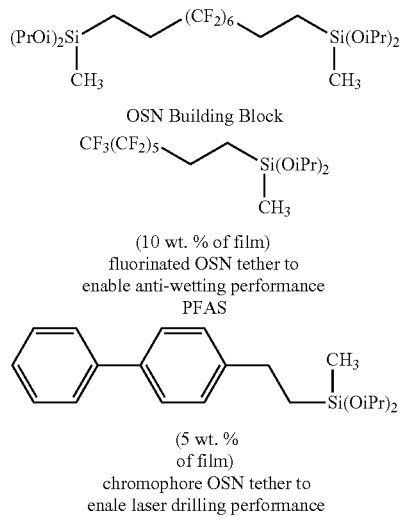

OSN Building Block (10 wt. % of film)
fluorinated OSN tether to
enable anti-wetting performance
PFAS (5 wt. %
of film)
chromophore OSN tether to
enale laser drilling performance

Example 3

Control

An anti-wetting coating was prepared as follows. 0.50 gram of 7,7,8,8,9,9,10,10,11,11,12,12-dodecafluoro-4-15-diisopropoxy-2,4,15,17-tetramethyl-3,16-dioxa-4,15-disilaoctadecane was dissolved in 0.50 gram methanol. 0.007 gram of a 1.0 molar tetrabutyl ammonium hydroxide solution in methanol was added to the solution and the solution was roll mixed for 3 hours at ambient temperature. After 3 hours mixing, the solution was homogeneous. 1.0 gram of cyclohexanone and 0.031 gram of water were added to the formulation and the formulation was mixed by vortex for 10 seconds at 1500 rpm then roll mixed for 30 minutes under ambient conditions to provide a clear solution. The solution was filtered through a 0.45 micron PTFE filter and draw-down coated onto a 15 centimeter by 8 centimeter square polyimide substrate using a gap coater. The liquid layer was air dried for 18 hours then cured at 180° C. for 2 hours to provide a coating with a thickness of about 1 to 2 micrometers.

Example 4

An anti-wetting coating comprising 20 weight percent (3,3,4,4,5,5,6,6,7,7,8,8,8-tridecafluorooctyl)diisopropoxy (methyl)silane was prepared as follows. 1.60 grams of 7,7,8,8,9,9,10,10,11,11,12,12-dodecafluoro-4-15-diisopropoxy-2,4,15,17-tetramethyl-3,16-dioxa-4,15-disilaoctadecane, 0.41 grams of (3,3,4,4,5,5,6,6,7,7,8,8,8-tridecafluorooctyl)diisopropoxy(methyl)silane, and 0.033 gram of a 1.0 molar tetrabutyl ammonium hydroxide solution in methanol were combined in 0.556 gram of n-butanol. 0.0856 gram of water was added to the formulation and the liquid formulation was mixed by vortex for 10 seconds at 1500 rpm then roll mixed for 30 minutes under ambient conditions to provide a clear solution. The solution was filtered through a 0.45 micron PTFE filter and draw-down coated onto a 15 centimeter by 8 centimeter square polyimide substrate using a gap coater. The liquid layer was air dried for 18 hours then cured at 180° C. for 2 hours to provide a coating with a thickness of about 1 to 2 micrometers.

Example 5

An anti-wetting coating comprising 30 weight percent (3,3,4,4,5,5,6,6,7,7,8,8,8-tridecafluorooctyl)diisopropoxy (methyl)silane was prepared as follows. 1.406 grams of 7,7,8,8,9,9,10,10,11,11,12,12-dodecafluoro-4-15-diisopropoxy-2,4,15,17-tetramethyl-3,16-dioxa-4,15-disilaoctadecane, 0.600 gram of (3,3,4,4,5,5,6,6,7,7,8,8,8-tridecafluorooctyl) diisopropoxy(methyl)silane, and 0.030 gram of a 1.0 molar tetrabutyl ammonium hydroxide solution in methanol were combined in 0.560 gram of n-butanol. 0.0869 gram of water was added to the formulation and the liquid formulation was mixed by vortex for 10 seconds at 1500 rpm then roll mixed for 30 minutes under ambient conditions to provide a clear solution. The solution was filtered through a 0.45 micron PTFE filter and draw-down coated onto a 15 centimeter by 8 centimeter square polyimide substrate using a gap coater. The liquid layer was air dried for 18 hours then cured at 180° C. for 2 hours to provide a coating with a thickness of about 1 to 2 micrometers.

Example 6

An anti-wetting coating comprising 50 weight percent (3,3,4,4,5,5,6,6,7,7,8,8,8-tridecafluorooctyl)diisopropoxy (methyl)silane was prepared as follows. 1.0 gram of 7,7,8,8, 9,9,10,10,11,11,12,12-dodecafluoro-4-15-diisopropoxy-2,4, 15,17-tetramethyl-3,16-dioxa-4,15-disilaoctadecane, 1.0 gram of (3,3,4,4,5,5,6,6,7,7,8,8,8-tridecafluorooctyl)diisopropoxy(methyl)silane, and 0.026 gram of a 1.0 molar tetrabutyl ammonium hydroxide solution in methanol were combined in 0.573 gram of n-butanol. 0.0756 gram of water was added to the formulation and the liquid formulation was mixed by vortex for 10 seconds at 1500 rpm then roll mixed for 30 minutes under ambient conditions to provide a clear solution. The solution was filtered through a 0.45 micron PTFE filter and draw-down coated onto a 15 centimeter by 8 centimeter square polyimide substrate using a gap coater. The liquid layer was air dried for 18 hours then cured at 180° C. for 2 hours to provide a coating with a thickness of about 1 to 2 micrometers.

Example 7

An anti-wetting coating comprising 5 weight percent (2-[1,1'-biphenyl]-4-yl)ethyl)diisopropoxy(methyl)silane was prepared as follows. 0.50 gram of 7,7,8,8,9,9,10,10,11,11,12, 12-dodecafluoro-4-15-diisopropoxy-2,4,15,17-tetramethyl-3,16-dioxa-4,15-disilaoctadecane, 0.025 gram of (2-([1,1'-biphenyl]-4-yl)ethyl)diisopropoxy(methyl)silane, and 0.0064 gram of a 1.0 molar tetrabutyl ammonium hydroxide solution in methanol were combined in 0.32 gram of n-butanol. 0.027 gram of water was added to the formulation and the liquid formulation was mixed by vortex for 10 seconds at 1500 rpm then roll mixed for 30 minutes under ambient conditions to provide a clear solution. The solution was filtered through a 0.45 micron PTFE filter and draw-down coated onto a 15 centimeter by 8 centimeter square polyimide substrate using a gap coater. The liquid layer was air dried for 18 hours then cured at 180° C. for 2 hours to provide a coating with a thickness of about 1 to 2 micrometers.

A comparison of the laser ablation performance of the control coating of Example 3 comprising a non-tethered coating and the tethered anti-wetting coatings of the present disclosure of Examples 4, 5, and 6 was performed. The contact angle and sliding angle of solid ink on the control Example 3 and Examples 4, 5, and 6 of the present embodiments after a simulated print head build process of one cycle of 290° C. and 350 psi for 39 minutes are shown in Table 1.

TABLE 1

| Example | % Fluorine | Time Zero | | After Build | |
|---|---|---|---|---|---|
| | | Contact Angle | Sliding Angle | Contact Angle | Sliding Angle |
| SPEC | — | >55° | <20° | >55° | <20° |
| 3 (Control) No tether | 48 | 45-47 | 19-22 | 51-58 | 18-40 |
| 4 | 51 | 62-64 | 4-7 | 62-62 | 7-11 |
| 5 | 52 | 63-65 | 6-7 | 61-68 | 10-12 |
| 6 | 55 | 63-66 | 4-7 | 66-68 | 7-11 |

Time Zero=before film is subjected to component fabrication/process.

After Build=after film is subjected to component fabrication/process.

FIG. 1 illustrates laser drilling performance on a film coated with the control coating of control Example 3. The laser was set to prepare a 40 micron aperture in an 8 by 15 centimeter polyimide film having a film thickness of 1 millimeter coated with the coating of control Example 3 at a thickness of 1 micron. The laser used was a KrF laser at 248 nanometers.

Figure 2:
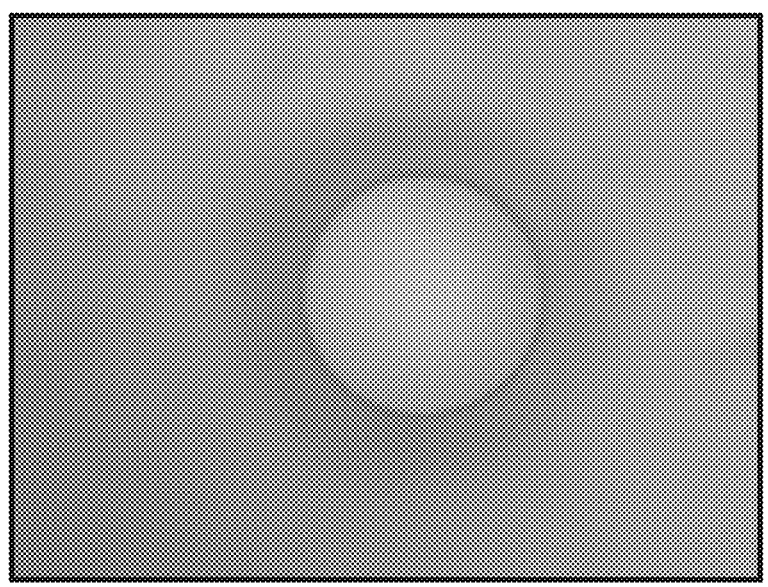
FIG. 2 is an illustration of laser drilling performance on an OSN film in accordance with the present embodiments.

FIG. 2 illustrates laser drilling performance wherein on a film coated with the coating of Example 7 of the present embodiments. The laser was set to prepare a 40 micron aperture in an 8 by 15 centimeter polyimide film having a film thickness of 1 millimeter coated with the coating of Example 7 at a thickness of 1 micron. The laser used was a KrF at 248 nanometers.

FIG. 2 shows the clean and efficient laser drilling performance achieved by integrating a chromophore tether into the OSN film.

Complete crosslinking was demonstrated by measuring the infrared spectrum of the layer (ATR-IR) and observing the absence of a hydroxyl band in the spectrum (incomplete crosslinking would leave unreacted silicon hydroxyl groups in the layer and would be detected by ATR-IR). A typical infrared spectrum of the OSN coating composition of Example 1 on a Upilex® polyimide film substrate is shown in FIG. 3. Furthermore, uniform distribution of the tether was evidenced by measuring the contact angle in different regions of the film; a narrow distribution of contact angles was observed over the film.

Solvent rub and soak tests were performed with a range of solvents of varying polarity, acidity, and basicity. Aggressive rubbing of the film did not damage the film. Similarly, soaking of the films for 6 months in a similar range of solvents did not deteriorate the integrity of the films. Furthermore, a stress test of exposing the films to liquid inks containing pigments, dyes, and other aggressive ink components at temperatures from 100-140° C. for 84 hours did not deteriorate the films.

Solvent rub tests and solvent soak tests of the films did not show evidence of leached tether.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An organo siloxy network film composition comprising:
   at least one type of tether molecule having a siloxy functionality;
   at least one type of building block having a siloxy functionality;
   wherein the tether molecule and the building block each have the same siloxy functionality; and
   wherein the siloxy functionality in the organo siloxy network film is derived from the same siloxy functionality on both the tether molecules and the building blocks;
   wherein the siloxy functionality used on both the tether molecule and the building block is of the formula

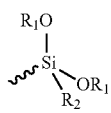

wherein each $R_1$ and $R_2$ are independently selected chemical groups, provided that $R_2$ on both the tether molecule and the building block is the same chemical group, and the wavy line indicates a bond to a tether molecule or building block moiety; and
   wherein one or both of $R_1$ on the tether molecule, but not the building block, comprises a chemical group selected from the group consisting of an aryl group, an alkylaryl group containing from about 6 to about 30 carbon atoms, wherein the alkylaryl group optionally further comprises an optional fluorine or an optional nitro group, or a combination thereof.

2. The organo siloxy network film composition of claim 1, wherein each $R_1$ on the building block and optionally one $R_1$ on the tether and each $R_2$ are independently selected from the group consisting of an alkyl group having from about 1 to about 22 carbon atoms.

3. The organo siloxy network film composition of claim 1, wherein the building block has a plurality of siloxy functionality ranging from about 2 to about 4 siloxy functional groups.

4. The organo siloxy network film composition of claim 1, wherein the tether is uniformly distributed throughout the film; or
   wherein the tether is non-uniformly distributed throughout the film.

5. The organo siloxy network film composition of claim 1, wherein the tether is present at a molar ratio between tether and building block of from about 1:100 to about 75:100.

6. The organo siloxy network film composition of claim 1, wherein the tether molecule comprises a member selected from the group consisting of organofluorine, aryl, alkyl, polyether, fluro-polyether, alkyl amine, alkylesters, alkyl sulfonates, aryl amines, alkyl alcohols, and alkyl carboxylic acids.

7. The organo siloxy network film composition of claim 1, wherein the tether molecule comprises a member selected from the group consisting of organofluorine, aryl, alkyl, polyether, fluro-polyether, alkyl amine, alkylesters, alkyl sulfonates, aryl amines, alkyl alcohols, and alkyl carboxylic acids;
   to impart a light absorption property to the organo-silane network film of from about 190 nanometers to about 350 nanometers.

8. The organo siloxy network film composition of claim 1, wherein the tether contains at least 1 to about 30 carbon atoms and from 1 to about 50 fluorine atoms;
   to impart an anti-wetting property to the organo-silane network film wherein the film exhibits a water contact angle of from about 80 degrees to about 160 degrees.

9. The organo siloxy network film composition of claim 1, wherein the organo-siloxy network film has a thermal stability of from about 200 degrees to about 300 degrees Celsius.

10. The organo siloxy network film composition of claim 1, wherein the film is a substantially pinhole-free film.

11. The organo siloxy network film composition of claim 1, wherein the building block comprises a silicon group of the formula

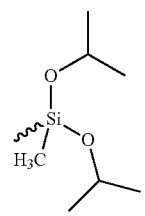

wherein ∿∿∿ represents the point of attachment between the OSN building block and the tether molecule.

12. The organo siloxy network film composition of claim 1, wherein the organo-siloxy network comprises at least one fluorinated tether molecule and at least one fluorinated building block.

13. The organo siloxy network film composition of claim 1, wherein the film composition contains a single type of tether molecule; or
   wherein the film composition contains a plurality of different types of tether molecules.

14. An organo siloxy network film composition comprising:
   at least one type of tether molecule having a siloxy functionality;
   at least one type of building block having a siloxy functionality;
   wherein the tether molecule and the building block each have the same siloxy functionality; and
   wherein the siloxy functionality in the organo siloxy network film is derived from the same siloxy functionality on both the tether molecules and the building blocks; and
   a light absorbing chromophore tether.

15. The organo siloxy network film composition of claim 1, wherein the tether molecule comprises an electroactive tether of the formula

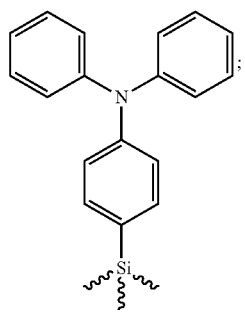

a hydrophilic tether of the formula

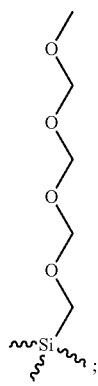

or
a hydrophilic tether of the formula

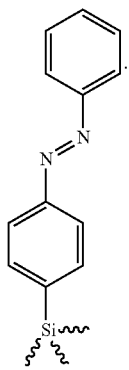

16. The organo siloxy network film composition of claim 1, wherein the tethered organo-siloxy network comprises a building block of the formula

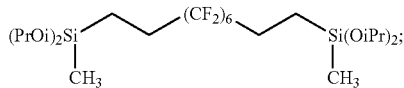

a tether of the formula

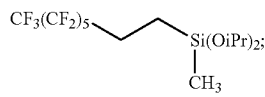

and
a chromophore tether of the formula

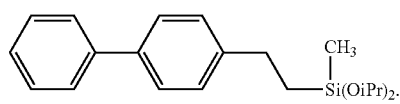

17. A process for preparing a tethered organo siloxy network film composition comprising:

(a) dissolving building block(s) and tether(s) in an alcohol;
(b) adding water to liquid in step (a) at from about 1 to about 6 molar ratio to moles of Si in solution in (a);
(c) adding Bronstead base to the liquid of step (b) at from about 0.001 to about 0.1 molar ratio to moles of Si in liquid in step (b);
(d) optionally heating the liquid in step (c); depositing the reaction mixture as a wet film; and promoting a change of the wet film and forming a dry tethered organo siloxy network film composition comprising:
at least one type of tether molecule having a siloxy functionality; at least one type of building block having a siloxy functionality; wherein the tether molecule and the building block each have the same siloxy functionality; and wherein the siloxy functionality in the organo siloxy network film is derived from the same siloxy functionality on both the tether molecules and the building blocks;
wherein the siloxy functionality used on both the tether molecule and the building block is of the formula

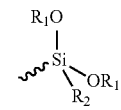

wherein each $R_1$ and $R_2$ are independently selected chemical groups, provided that $R_2$ on both the tether molecule and the building block is the same chemical group, and the wavy line indicates a bond to a tether molecule or building block moiety; and
wherein one or both of $R_1$ on the tether molecule, but not the building block, comprises a chemical group selected from the group consisting of an aryl group, an alkylaryl group containing from about 6 to about 30 carbon atoms, wherein the alkylaryl group optionally further comprises an optional fluorine or an optional nitro group, or a combination thereof.

18. An ink jet print head face plate having disposed thereon an organo siloxy network film composition comprising:
at least one type of tether molecule having a siloxy functionality;
at least one type of building block having a siloxy functionality;
wherein the tether molecule and the building block each have the same siloxy functionality; and
wherein the siloxy functionality in the organo siloxy network film is derived from the same siloxy functionality on both the tether molecules and the building blocks;
wherein the siloxy functionality used on both the tether molecule and the building block is of the formula

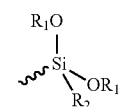

wherein each $R_1$ and $R_2$ are independently selected chemical groups, provided that $R_2$ on both the tether molecule and the building block is the same chemical group, and the wavy line indicates a bond to a tether molecule or building block moiety; and
wherein one or both of $R_1$ on the tether molecule, but not the building block, comprises a chemical group selected from the group consisting of an aryl group, an alkylaryl group containing from about 6 to about 30 carbon atoms, wherein the alkylaryl group optionally further comprises an optional fluorine or an optional nitro group, or a combination thereof.

* * * * *